(12) United States Patent
Kurita et al.

(10) Patent No.: US 10,844,798 B2
(45) Date of Patent: Nov. 24, 2020

(54) ENGINE CONTROL DEVICE

(71) Applicant: Mazda Motor Corporation, Hiroshima (JP)

(72) Inventors: Hiroyuki Kurita, Hiroshima (JP); Eijiro Tanaka, Hiroshima (JP); Takeatsu Ito, Hiroshima (JP); Hiroshi Yoshida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/435,816

(22) Filed: Jun. 10, 2019

(65) Prior Publication Data

US 2020/0025118 A1 Jan. 23, 2020

(30) Foreign Application Priority Data

Jul. 17, 2018 (JP) .................. 2018-134208

(51) Int. Cl.
*F02D 41/02* (2006.01)
*B60W 30/18* (2012.01)
*F01N 3/029* (2006.01)

(52) U.S. Cl.
CPC ..... *F02D 41/029* (2013.01); *B60W 30/18127* (2013.01); *F01N 3/029* (2013.01); *F02D 2200/101* (2013.01)

(58) Field of Classification Search
CPC ............ F02D 41/029; F02D 2200/101; F02D 41/123; F02D 2200/0812; F02D 2200/0802; F01N 3/029; F01N 3/0253; F01N 9/002; F01N 2900/12; F01N 2900/1606; F01N 2900/1404; F01N 2560/06; F01N 2430/06; F01N 2260/04; B60W 30/18127

USPC .................. 60/285, 286, 295, 297, 299, 301
See application file for complete search history.

(56) References Cited

U.S. PATENT DOCUMENTS 7,478,528 B2 * 1/2009 Ament ..................... F01N 3/035
                                                      60/274
8,474,247 B2 * 7/2013 Gomez, III ........... F02D 41/029
                                                      60/295
2002/0162325 A1 * 11/2002 Kato .................. B01D 53/0438
                                                      60/297

(Continued)

FOREIGN PATENT DOCUMENTS

JP          4453718 B2      4/2010

*Primary Examiner* — Hoang M Nguyen
(74) *Attorney, Agent, or Firm* — Alleman Hall Creasman & Tuttle LLP

(57) ABSTRACT

An engine control device that can suppress thermal degradation of a particulate filter is provided. The device executes a fuel injection control module that restricts the supply of fuel by an injector if a fuel cutting condition is satisfied, an accumulation estimation module that estimates the accumulated amount of soot trapped in a GPF, and a regeneration control module that performs regeneration control for regenerating the GPF by burning soot if the accumulated soot amount exceeds a predetermined setting amount. A fuel cut prohibition line is set in advance and defines a prohibition temperature at which fuel cutting control is to be prohibited in accordance with the accumulated soot amount. The device further executes a prohibition control module that prohibits performance of fuel cutting control by the fuel injection control module if the temperature of the GPF is higher than the prohibition temperature.

10 Claims, 7 Drawing Sheets

(56) References Cited

U.S. PATENT DOCUMENTS

| | | | |
|---|---|---|---|
| 2008/0155964 A1* | 7/2008 | Kilkenny | F02D 41/0235 60/286 |
| 2010/0205942 A1* | 8/2010 | Fujiwara | F02D 41/029 60/285 |
| 2010/0236222 A1* | 9/2010 | Gomez, III | F02D 41/405 60/277 |
| 2016/0123200 A1* | 5/2016 | Ramappan | F02D 37/02 60/285 |
| 2017/0198615 A1* | 7/2017 | Wada | F01M 11/10 |
| 2018/0106206 A1* | 4/2018 | Tsunoda | F02N 11/0829 |

* cited by examiner

ENGINE CONTROL DEVICE

CROSS-REFERENCES TO RELATED APPLICATIONS

This application claims priority to Japanese Patent Application No. 2018-134208 filed on Jul. 17, 2018, the entire contents of which are incorporated herein by reference.

TECHNICAL FIELD

The present invention relates to an engine control device for an engine in which a particulate filter is arranged in an exhaust passage.

BACKGROUND ART

An exhaust passage for exhaust gas that is to be discharged from an engine body is sometimes provided with a particulate filter for trapping particulates (soot) that are contained in the exhaust gas. As the accumulated amount of soot in the particulate filter rises, the filtering performance falls. For this reason, when the accumulated amount of soot exceeds a certain amount, regeneration control is performed to proactively supply oxygen to the particulate filter and oxidize (burn) the accumulated soot.

However, if the engine is used in an operating aspect in which the frequency of high-load operation is low for example, the exhaust gas does not reach a high temperature, and therefore there are cases where a temperature sufficient for soot oxidation in the regeneration control is not obtained. In such a case, the accumulated amount of soot reaches an excessive state. If fuel cutting is performed during deceleration in this state, the accumulated soot will burn all at once due to the supplied oxygen, and there is concern that this will result in thermal degradation of the particulate filter. JP4453718B discloses an intake control that addresses the aforementioned problem of thermal degradation caused by the rapid burning of a large amount of soot.

JP4453718B is an example of related art.

SUMMARY OF THE INVENTION

Problems to be Solved by the Invention

In order to solve the aforementioned problem, it is also conceivable to prohibit a fuel restriction control such as fuel cutting, which results in the supply of a large amount of oxygen, if the accumulated amount of soot in the particulate filter has reached a certain amount. However, it was found that even when the accumulated amount of soot is relatively low, it is possible for thermal degradation of the particulate filter to occur due to the burning of soot that accompanies fuel cutting or the like.

An object of the present invention is to provide an engine control device that can suppress thermal degradation of a particulate filter.

Means for Solving Problems

An engine control device according to an aspect of the present invention is an engine control device including a particulate filter that is arranged in an exhaust passage of the engine body, a fuel injection device that supplies fuel to the engine body, a storage device that stores a prohibition temperature according to which a fuel restriction control is to be prohibited, and a processor configured to execute a supply control module that performs a fuel restriction control for restricting supply of the fuel by the fuel injection device if a predetermined fuel supply restriction condition is satisfied; an estimation module that estimates an accumulated amount of soot trapped in the particulate filter; a regeneration control module that performs a regeneration control for regenerating the particulate filter by burning soot if the accumulated amount estimated by the estimation module exceeds a predetermined setting amount; and a prohibition control module that prohibits performance of the fuel restriction control by the supply control module if a temperature of the particulate filter is higher than the prohibition temperature, the prohibition temperature being set higher when the accumulated amount of soot is lower than when the accumulated amount of soot is higher.

According to this engine control device, the regeneration control is performed if the accumulated amount of soot in the particulate filter exceeds the setting amount. On the other hand, a prohibition temperature is set in advance for prohibiting the fuel restriction control, a typical example of which is fuel cutting performed during deceleration, and the fuel restriction control is prohibited if the temperature of the particulate filter is higher than the prohibition temperature. In other words, regardless of the accumulated amount of soot in the particulate filter, if the temperature of the particulate filter is higher than the prohibition temperature, fuel restriction control, which results in the supply of oxygen to the particulate filter, is not performed. For this reason, when the prohibition temperature has been exceeded, soot is not burned in the particulate filter due to the performance of fuel restriction control. Accordingly, it is possible to suppress thermal degradation of the particulate filter.

In the above engine control device, it is desirable for the processor to be further configured to execute an intake control module that performs a control such that an air-fuel ratio of an air-fuel mixture to be supplied to the engine body is set to a stoichiometric air-fuel ratio if the prohibition control module prohibits performance of the fuel restriction control.

According to this engine control device, the intake control module sets the air-fuel ratio to the stoichiometric air-fuel ratio when the fuel restriction control is prohibited, thus making it possible to suppress the worsening of emissions when the fuel restriction control is prohibited.

In the above engine control device, it is desirable that when performing the regeneration control, the regeneration control module performs at least one of control for correcting an air-fuel ratio of an air-fuel mixture supplied to the engine body to a ratio that is leaner than a stoichiometric air-fuel ratio and control for correcting an air-fuel mixture ignition timing to a retarded timing relative to an ignition timing during normal operation.

According to this engine control device, setting the air-fuel mixture to a lean ratio makes it possible to supply oxygen to the particulate filter in the exhaust passage. Also, retarding the ignition timing produces uncombusted oil components along with the oxygen, and these components can be supplied to the particulate filter. The soot that has accumulated in the particulate filter can be oxidized (burned) using the supplied oxygen and/or the supplied uncombusted oil components.

In the above engine control device, it is desirable that the supply control module performs the fuel restriction control if deceleration of the engine is detected.

According to this engine control device, the fuel restriction control is performed when the engine decelerates. This fuel restriction control is generally fuel cutting for completely cutting off the supply of fuel. When such fuel cutting is performed, the amount of oxygen supplied to the particulate filter becomes the highest. In other words, this is a condition that can cause the highest extent of thermal degradation to the particulate filter. Accordingly, by prohibiting the fuel cutting if the temperature of the particulate filter is higher than the prohibition temperature, it is possible to effectively suppress thermal degradation.

In the above engine control device, it is desirable that the engine includes an electrical device that performs regenerative braking, and the processor is further configured to include a recovery control module that increases an extent of the regenerative braking if the prohibition control module prevents performance of the fuel restriction control.

When the fuel restriction control (fuel cutting) is prohibited, fuel is supplied even during deceleration, and the extent of deceleration decreases. According to the above engine control device, the extent of regenerative braking is increased in such a case. Accordingly, regenerative braking can compensate for the decrease in the extent of deceleration that accompanies the prohibition of fuel cutting.

Effects of the Invention

According to the present invention, it is possible to provide an engine control device that can suppress thermal degradation of a particulate filter.

EMBODIMENTS OF THE INVENTION

Overall Configuration of Engine

Figure 1:
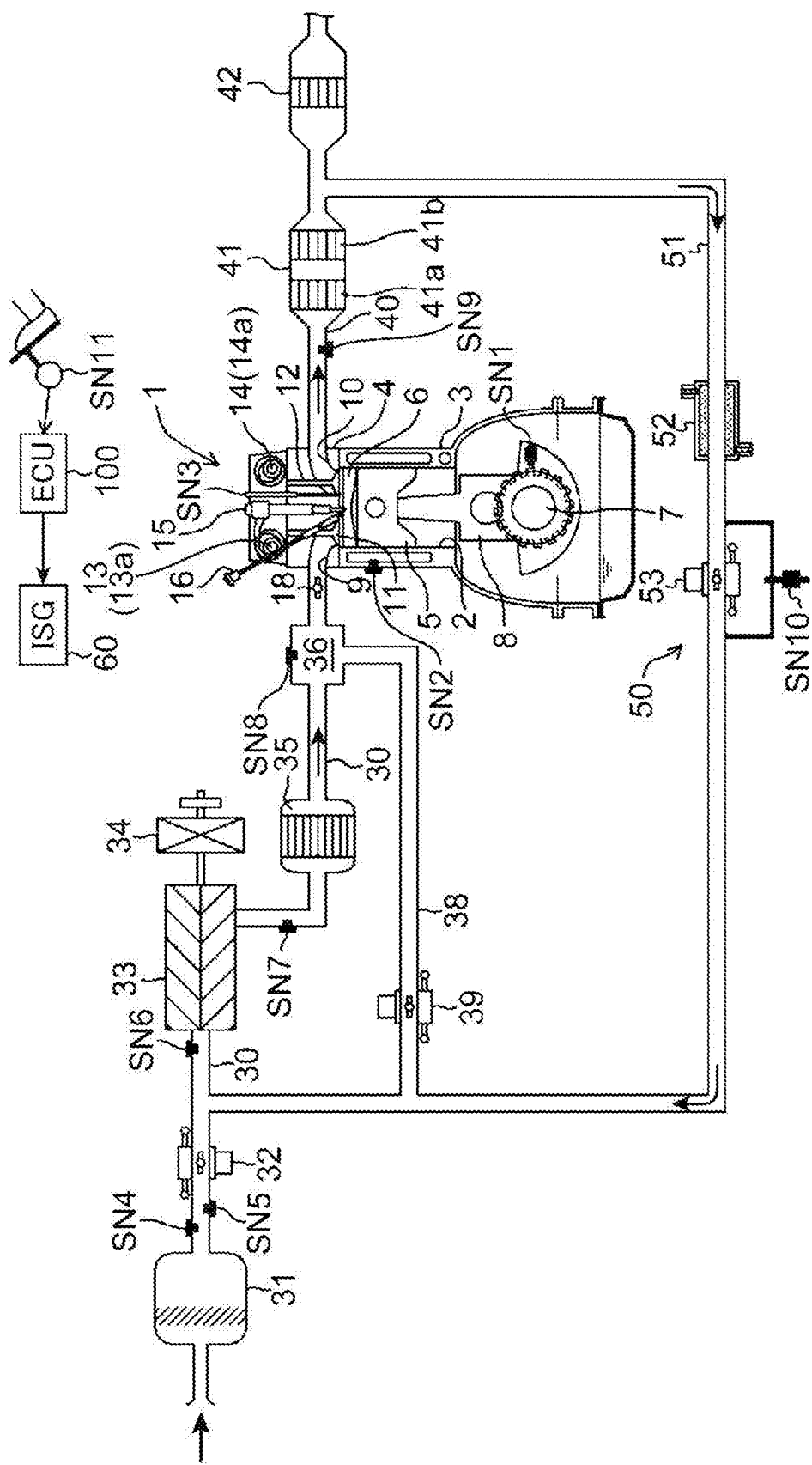
FIG. 1 is a system diagram showing an example of an engine to which an engine control device according to the present invention is applied.

FIG. 1 is a system diagram showing an embodiment of an engine to which a control device of the present invention is applied. The engine shown in FIG. 1 is a four-cycle gasoline direct-injection engine that is installed in a vehicle as a power source for travelling, and includes an engine body 1, an intake path 30 for the flow of intake air that is to be introduced to the engine body 1, an exhaust passage 40 for the flow of exhaust gas that is to be discharged from the engine body 1, and an external exhaust gas recirculation (EGR) device 50 by which part of the exhaust gas flowing through the exhaust passage 40 is returned to the intake path 30.

The engine body 1 includes a cylinder block 3 in which a cylinder 2 has been formed, a cylinder head 4 that is attached to the upper face of the cylinder block 3 so as to close off the cylinder 2 from above, and a piston 5 that is inserted into the cylinder 2 and can reciprocate therein. The engine body 1 is typically a multi-cylinder type of engine body that has a plurality of (e.g., four) cylinders, but only one cylinder 2 is shown in FIG. 1 for the sake of simplification.

A combustion chamber 6 is defined above the piston 5. Fuel, which contains gasoline as a main component, is supplied to the combustion chamber 6 by being injected from a later-described injector 15. The supplied fuel combusts while mixing with air in the combustion chamber 6, and the piston 5 is pushed downward by expansion force from the combustion, thus reciprocating upward and downward. Note that the fuel injected into the combustion chamber 6 need only contain gasoline as a main component, and may also include a subcomponent such as bioethanol in addition to the gasoline, for example.

A crankshaft 7, which is an output shaft of the engine body 1, is provided below the piston 5. The crankshaft 7 is coupled to the piston 5 via a connecting rod 8, and is driven to rotate about a central axis in accordance with the reciprocating movement (up/down movement) of the piston 5.

A crank angle sensor SN1 and a water temperature sensor SN2 are provided in the cylinder block 3. The crank angle sensor SN1 detects the rotation angle of the crankshaft 7 (crank angle) and the rotation speed of the crankshaft 7 (engine rotation speed). The water temperature sensor SN2 detects the temperature of coolant flowing inside the cylinder block 3 and cylinder head 4 (i.e., the engine water temperature).

The cylinder head 4 is provided with an intake port 9 and an exhaust port 10 that are in communication with the combustion chamber 6, an intake valve 11 that opens and closes the intake port 9, and an exhaust valve 12 that opens and closes the exhaust port 10. Note that the engine is a dual-intake-valve and dual-exhaust-valve four-valve type of engine, and two intake ports 9 and two exhaust ports 10 are provided for each cylinder 2. The intake valve 11 and the exhaust valve 12 are also provided for each intake port 9 and exhaust port 10. Note that a swirl valve 18 for forming a swirl flow in the combustion chamber 6 is arranged on one side of the intake port 9.

Valve actuation mechanisms 13 and 14, which are arranged in the cylinder head 4 and include a pair of cam shafts and the like, drive the intake valve 11 and the exhaust valve 12 to open and close in conjunction with rotation of the crankshaft 7. An intake variable valve timing mechanism (VVT) 13*a* capable of changing the valve timing of the intake valve 11 is provided in the valve actuation mechanism 13 for the intake valve 11. Similarly, an exhaust variable valve timing mechanism (VVT) 14*a* capable of changing the valve timing of the exhaust valve 12 is provided in the valve actuation mechanism 14 for the exhaust valve 12. The intake VVT 13*a* (exhaust VVT 14*a*) is a so-called phase variable mechanism, and changes the open period and the closed period of the intake valve 11 (exhaust valve 12) at the same time and by the same amount. Through such control of the intake VVT 13*a* and the exhaust VVT 14*a*, it is possible to adjust the valve overlap period in which the intake valve 11 and the exhaust valve 12 are both open in a period spanning the exhaust top dead center. Also, by adjusting the valve overlap period, it is possible to adjust the amount of burned gas (internal EGR gas) that remains in the combustion chamber 6.

The cylinder head 4 is provided with an injector 15 (fuel injection device) that injects (supplies) fuel that contains gasoline into the combustion chamber 6 (engine body), and a spark plug 16 that ignites an air-fuel mixture that includes a mixture of the fuel injected into the combustion chamber 6 by the injector 15 and air introduced to the combustion chamber 6. The cylinder head 4 is further provided with a cylinder pressure sensor SN3 that detects the pressure (in-cylinder pressure) in the combustion chamber 6.

The injector 15 is a multi-hole injector that has a plurality of injection holes in the leading end portion, and can inject fuel in a radiating manner from the injection holes. The injector 15 is arranged at the central portion of the ceiling face of the combustion chamber 6 such that the leading end portion faces a cavity formed in the central portion of the crest face of the piston 5. The spark plug 16 is arranged at a position that is shifted somewhat to the intake side from the injector 15.

The intake path 30 is connected to one side face of the cylinder head 4 so as to be in communication with the intake port 9. Air (new air) taken in from the upstream end of the intake path 30 passes through the intake path 30 and the intake port 9 and is introduced to the combustion chamber 6. The intake path 30 is provided with, in order from the upstream side thereof, an air cleaner 31 that removes foreign matter from intake air, a throttle valve 32 that can open and close to adjust the intake flow rate, a supercharger 33 that compresses and feeds intake air, an intercooler 35 that cools the intake air compressed by the supercharger 33, and a surge tank 36.

An airflow sensor SN4 that detects the intake flow rate, first and second intake temperature sensors SN5 and SN7 that detect the intake temperature, and first and second intake pressure sensors SN6 and SN8 that detect the intake pressure are arranged at predetermined positions in the intake path 30. The airflow sensor SN4 and the first intake temperature sensor SN5 are provided at locations between the air cleaner 31 and the throttle valve 32 in the intake path 30, and respectively detect the flow rate and the temperature of intake air that passes such locations. The first intake pressure sensor SN6 is provided at a location between the throttle valve 32 and the supercharger 33 in the intake path 30 (i.e., downstream of a connection port of a later-described EGR passage 51) and detects the pressure of intake air that passes that location. The second intake temperature sensor SN7 is provided at a location between the supercharger 33 and the intercooler 35 in the intake path 30 and detects the temperature of intake air that passes that location. The second intake pressure sensor SN8 is provided in the surge tank 36 and detects the pressure of intake air in the surge tank 36.

The supercharger 33 is a mechanical supercharger that is mechanically linked to the engine body 1. There are no particular limitations on the specific type of supercharger 33, and a known Lysholm, roots, centrifugal supercharger, or the like can be used as the supercharger 33. An electromagnetic clutch 34 capable of electrically switching between engagement and disengagement is provided between the supercharger 33 and the engine body 1. When the electromagnetic clutch 34 is engaged, drive force is transmitted from the engine body 1 to the supercharger 33, and the supercharger 33 performs supercharging. However, when the electromagnetic clutch 34 is disengaged, the transmission of a drive force is cut off, and the supercharger 33 stops performing supercharging.

A bypass passage 38 for bypassing the supercharger 33 is provided in the intake path 30. The bypass passage 38 connects the surge tank 36 and the later-described EGR passage 51 to each other. An openable/closeable bypass valve 39 is provided in the bypass passage 38.

The exhaust passage 40 is connected to the other side face of the cylinder head 4 so as to be in communication with the exhaust port 10. Burned gas produced in the combustion chamber 6 passes through the exhaust port 10 and the exhaust passage 40 and is discharged to the outside. An upstream catalytic converter 41 and a downstream catalytic converter 42 are respectively provided on an upstream side and a downstream side, with respect to the exhaust gas flow direction, in the exhaust passage 40. The upstream catalytic converter 41 includes a three-way catalyst 41a and a GPF (Gasoline Particulate Filter) 41b (particulate filter). The three-way catalyst 41a traps harmful components (HC, CO, $NO_x$) contained in the exhaust gas flowing through the exhaust passage 40. The GPF 41b traps particulate matter contained in the exhaust gas, which is typically soot and will simply be called "soot" hereinafter. The downstream catalytic converter 42 is a catalytic converter that includes an appropriate catalyst such as a three-way catalyst or a $NO_x$ catalyst.

The GPF 41b provided in the exhaust passage traps soot contained in the exhaust gas, and as the accumulated amount of soot in the GPF 41b rises, the soot filtering performance decreases. For this reason, when the accumulated amount of soot exceeds a certain amount, a regeneration control is performed to proactively supply oxygen to the GPF 41b and oxidize (burn) the accumulated soot. It should be noted that if a situation occurs in which a large amount of oxygen is rapidly supplied to the GPF 41b, a problem can occur in which the accumulated soot burns all at once, and such burning causes thermal degradation and, in an extreme case, erosion of the GPF 41b. The aforementioned situation in which a large amount of oxygen is rapidly supplied is created by a fuel cutting control (fuel restriction control) that is typically performed during vehicle deceleration. Also, the soot burns when the GPF 41b has risen to a predetermined temperature (prohibition temperature) or higher. In light of the above, in the present embodiment, the GPF 41b is protected by prohibiting the performance of the fuel cutting control under a condition that the GPF 41b has risen to a high temperature. This will be described in detail later.

An exhaust temperature sensor SN9 that measures the temperature of exhaust gas is arranged at a location on the upstream side of the upstream catalytic converter 41 in the exhaust passage 40. The temperature measured by the exhaust temperature sensor SN9 is the temperature of exhaust gas introduced to the GPF 41b, and can substantially be handled as the temperature of the GPF 41b.

The external EGR device 50 has an EGR passage 51 that connects the exhaust passage 40 and the intake path 30 to each other, an EGR cooler 52 that is provided in the EGR passage 51, and an EGR valve 53. The EGR passage 51 connects a portion of the exhaust passage 40 that is on the downstream side of the upstream catalytic converter 41 to a portion of the intake path 30 that is between the throttle valve 32 and the supercharger 33. Through heat exchange, the EGR cooler 52 cools exhaust gas (external EGR gas) that is returned from the exhaust passage 40 to the intake path 30 via the EGR passage 51. The EGR valve 53 is provided so as to open and close the EGR passage 51 at a location on the downstream side of the EGR cooler 52 (i.e., on the side in proximity to the intake path 30), and adjusts the flow rate of exhaust gas that flows through the EGR passage 51. The EGR passage 51 is provided with a differential pressure sensor SN10 for detecting the difference between the pressures on the upstream side and the downstream side of the EGR valve 53.

Control System

Figure 2:
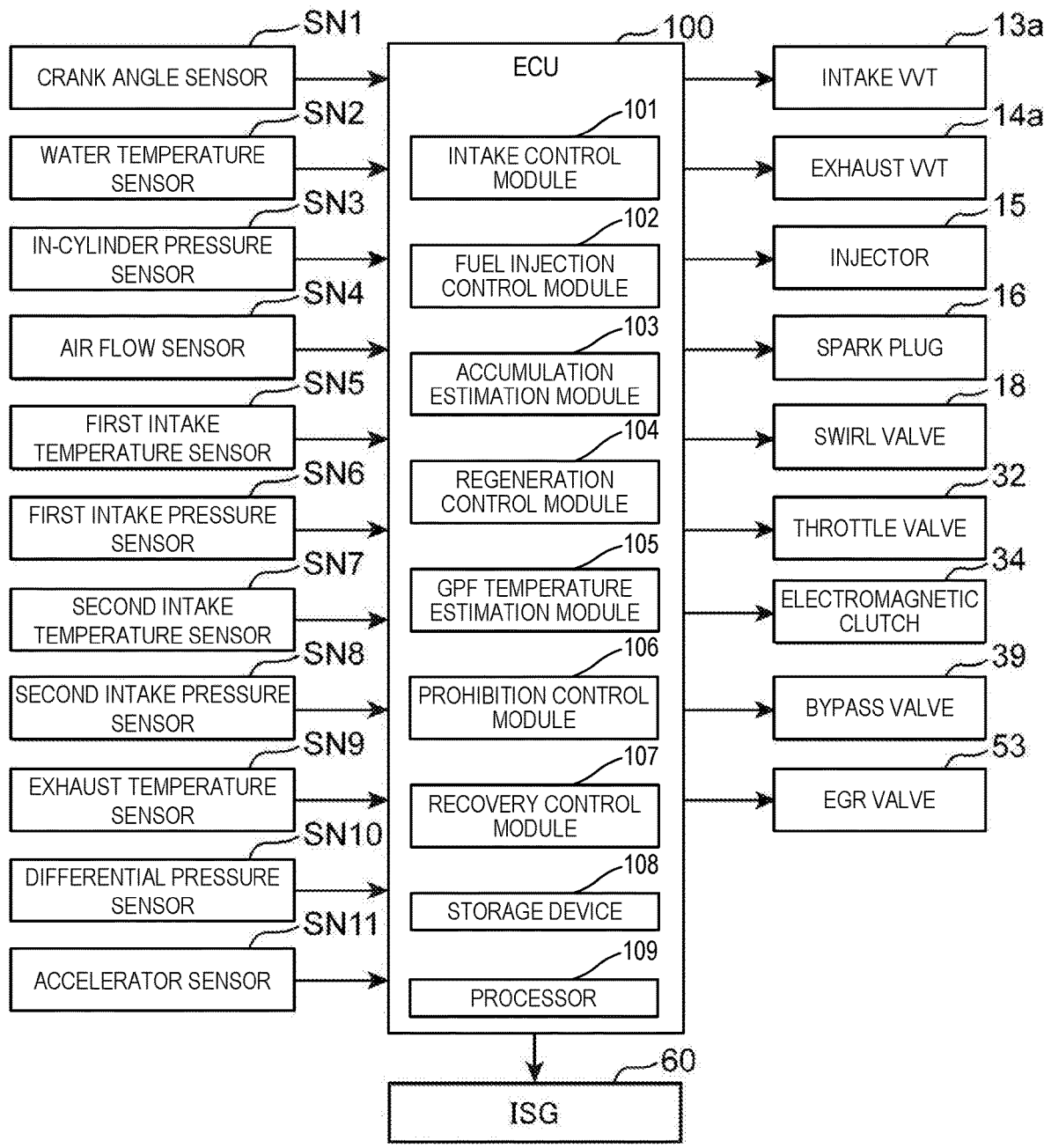
FIG. 2 is a block diagram showing a control system of the engine.

FIG. 2 is a block diagram showing a control system of the engine. An electronic control unit (ECU) 100 (engine control device) shown in this figure is a microprocessor for performing overall control of the engine, and is constituted by a processor 109 (e.g., a central processing unit (CPU)), a storage device 108 such as a ROM and/or a RAM, and the like, which are known.

The ECU 100 receives detection signals from various types of sensors. The ECU 100 is electrically connected to the crank angle sensor SN1, the water temperature sensor SN2, the cylinder pressure sensor SN3, the airflow sensor SN4, the first and second intake temperature sensors SN5 and SN7, the first and second intake pressure sensors SN6 and SN8, the exhaust temperature sensor SN9, and the differential pressure sensor SN10 that were described above. Information detected by these sensors (i.e., a crank angle, an engine rotation speed, an engine water temperature, an in-cylinder pressure, an intake flow rate, an intake temperature, an intake pressure, a differential pressure between the front and rear of the EGR valve 53, an exhaust gas temperature, and the like) are successively input to the ECU 100.

The vehicle is provided with an accelerator sensor SN11 that detects the position of the accelerator pedal that is operated by a driver who is driving the vehicle. A detection signal obtained by the accelerator sensor SN11 is also input to the ECU 100.

The vehicle is further provided with an ISG (Integrated Starter Generator) 60 (one example of an electrical device), which is a generator that has a motor function. The ISG 60 is an electrical device for obtaining regenerative energy by generating electricity with use of energy produced during vehicle deceleration. The electricity generated by the ISG 60 is stored in a battery that is not shown in the drawings. Note that during this energy generation, the motor of the ISG 60 becomes a load of engine rotation, and regenerative braking is performed. On the other hand, during high-load operation such as vehicle acceleration, the ISG 60 assists the engine by operating as a motor. The ISG 60 also functions as a motor for restarting the engine after being stopped during idling. The operation of the ISG 60 is controlled by the ECU 100 (recovery control module 107).

The ECU 100 controls components of the engine while executing various calculations, making various determinations, and so on based on input information received from the above-described sensors. Specifically, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, and the like, and outputs control signals to such devices based on results of the aforementioned calculations and the like.

By executing predetermined programs, the ECU 100 operates so as to functionally embody an intake control module 101, a fuel injection control module 102 (supply control module), an accumulation estimation module 103 (estimation module), a regeneration control module 104, a GPF temperature estimation module 105, a prohibition control module 106, a recovery control module 107, and a storage device 108.

The intake control module 101 is a control module for adjusting the flow rate and the pressure of intake air that is to be introduced to the combustion chamber 6, and controls the opening degrees of the throttle valve 32 and the bypass valve 39 and controls the ON/OFF switching of the electromagnetic clutch 34. In the present embodiment, control is performed such that when the prohibition control module 106 prohibits the performance of fuel cutting control (fuel restriction control), the air-fuel ratio of the air-fuel mixture that is to be supplied to the combustion chamber 6 (engine body) is set to a stoichiometric air-fuel ratio ($\lambda=1$).

The fuel injection control module 102 is a control module for controlling the fuel injection operation performed by the injector 15. The fuel injection control module 102 determines an injection amount and an injection timing for the injection of fuel from the injector 15 based on an engine load (required torque) that is specified from the engine rotation speed detected by the crank angle sensor SN1 and the accelerator pedal position detected by the accelerator sensor SN11, and based on the intake flow rate detected by the airflow sensor SN4, and the fuel injection control module 102 controls the injector 15 in accordance with the determination results.

The fuel injection control module 102 also performs a fuel restriction control for restricting the supply of fuel from the injector 15 when a predetermined fuel supply restriction condition is satisfied. A typical example of such fuel restriction control is fuel cutting control performed during vehicle deceleration, as previously mentioned. The fuel injection control module 102 performs a fuel cutting control when engine deceleration is detected. Fuel cutting control is also performed in over-revolution control that is for restricting an excessive rise in the engine rotation speed. Another example of fuel restriction control is control in which the supply of fuel from the injector 15 is not completely stopped, and the air-fuel mixture is set to a highly lean ratio.

The accumulation estimation module 103 performs processing for estimating the accumulated amount of soot that has been trapped in the GPF 41b. Although described in detail later with reference to FIG. 3, the accumulation estimation module 103 obtains a real-time amount of soot that is trapped in the GPF 41b based on a real-time amount of soot that is being generated by the engine body 1 in the current state and a real-time soot trapping rate that is the soot trapping performance of the GPF 41b in the current state. The accumulation estimation module 103 then calculates an integrated trapped soot amount (current value of the accumulated soot amount) in the GPF 41b in the current state based on a real-time soot regeneration amount that indicates the soot regeneration performance of the GPF 41b in the current state and the aforementioned real-time trapped soot amount.

The regeneration control module 104 performs regeneration control for regenerating the GPF 41b by burning soot therein when the accumulated soot amount in the GPF 41b estimated by the accumulation estimation module 103 exceeds a predetermined set value. As described above, the regeneration control is control in which oxygen is proactively supplied to the GPF 41b via the exhaust passage 40, and the soot trapped in the GPF 41b is burned using the heat held by the GPF 41b and the supplied oxygen (a specific example will be described later using FIG. 4).

The GPF temperature estimation module 105 performs processing for estimating the temperature of the GPF 41b. In the present embodiment, the exhaust temperature sensor SN9 is arranged on the upstream side of the upstream catalytic converter 41. The GPF temperature estimation module 105 handles the exhaust gas temperature detected by the exhaust temperature sensor SN9 (or a value that has been corrected as desired) as the temperature of the GPF 41b. Note that in a modified embodiment in which the exhaust temperature sensor SN9 is not provided, the GPF temperature estimation module 105 performs calculation for estimating the exhaust gas temperature based on a thermal model expression that has the air intake amount, the fuel injection amount, and the like as parameters, and handles the estimated value as the temperature of the GPF 41b.

If the temperature of the GPF 41b obtained by the GPF temperature estimation module 105 is higher than a predetermined prohibition temperature, the prohibition control module 106 prohibits the performance of fuel restriction control by the fuel injection control module 102. As previously described, if fuel restriction control is performed while the GPF 41b is in a high temperature state, the accumulated soot will burn all at once when a large amount of oxygen is supplied to the GPF 41b. In particular, in fuel cutting performed during deceleration, the supply of fuel is completely cut off, and therefore the amount of oxygen supplied to the GPF 41b rises the highest. In other words, this is a condition that can cause the highest extent of thermal degradation to the GPF 41b. In order to suppress thermal degradation of the GPF 41b caused by fuel restriction control, which is typically fuel cutting, the prohibition control module 106 does not allow performance of fuel restriction control when the temperature of the GPF 41b is higher than the prohibition temperature.

The recovery control module 107 controls operation of the ISG 60. Also, when the performance of fuel restriction control is prohibited by the prohibition control module 106, the recovery control module 107 increases the extent of regenerative braking performed by the ISG 60 (increases the regenerative braking force). For example, the recovery control module 107 increases the extent of regenerative braking applied to the engine by increasing the target generation voltage of the ISG 60 (e.g., if the normal target generation voltage is 12 V, the voltage is increased to 16 V) and raising the load of the ISG 60. When fuel restriction control (fuel cutting) is prohibited, fuel is supplied to the combustion chamber 6 even during deceleration, and the extent of deceleration decreases. In this case, there is a possibility of causing the driver of the vehicle to feel a concerning sensation of insufficient deceleration. In order to eliminate this concerning sensation, the recovery control module 107 uses regenerative braking to make up for the decrease in the extent of deceleration that accompanies fuel cutting.

The storage device 108 stores the prohibition temperature that serves as the basis when the prohibition control module 106 determines whether or not to prohibit fuel restriction control. The prohibition temperature is set in advance in accordance with the accumulated soot amount in the GPF 41b. For example, the storage device 108 stores a table that associates accumulated soot amounts with GPF 41b temperatures. The prohibition control module 106 obtains the GPF 41b temperature obtained by the GPF temperature estimation module 105 and the current value of the accumulated soot amount in the GPF 41b obtained by the accumulation estimation module 103, applies the values to the table stored in the storage device 108 to acquire the prohibition temperature in the current state, and determines whether fuel restriction control is to be performed or prohibited based on the prohibition temperature.

Details of Various Types of Control

Next, the main types of control performed by the functional modules of the ECU 100 will be described in detail with reference to FIGS. 3 to 5. The following describes (1) processing performed by the accumulation estimation module 103 to estimate the accumulated soot amount in the GPF 41b, (2) processing performed by the regeneration control module 104 to regenerate the GPF 41b, and (3) processing performed by the prohibition control module 106 to prohibit fuel restriction control.

(1) Accumulated Soot Amount Estimation Processing

Figure 3:
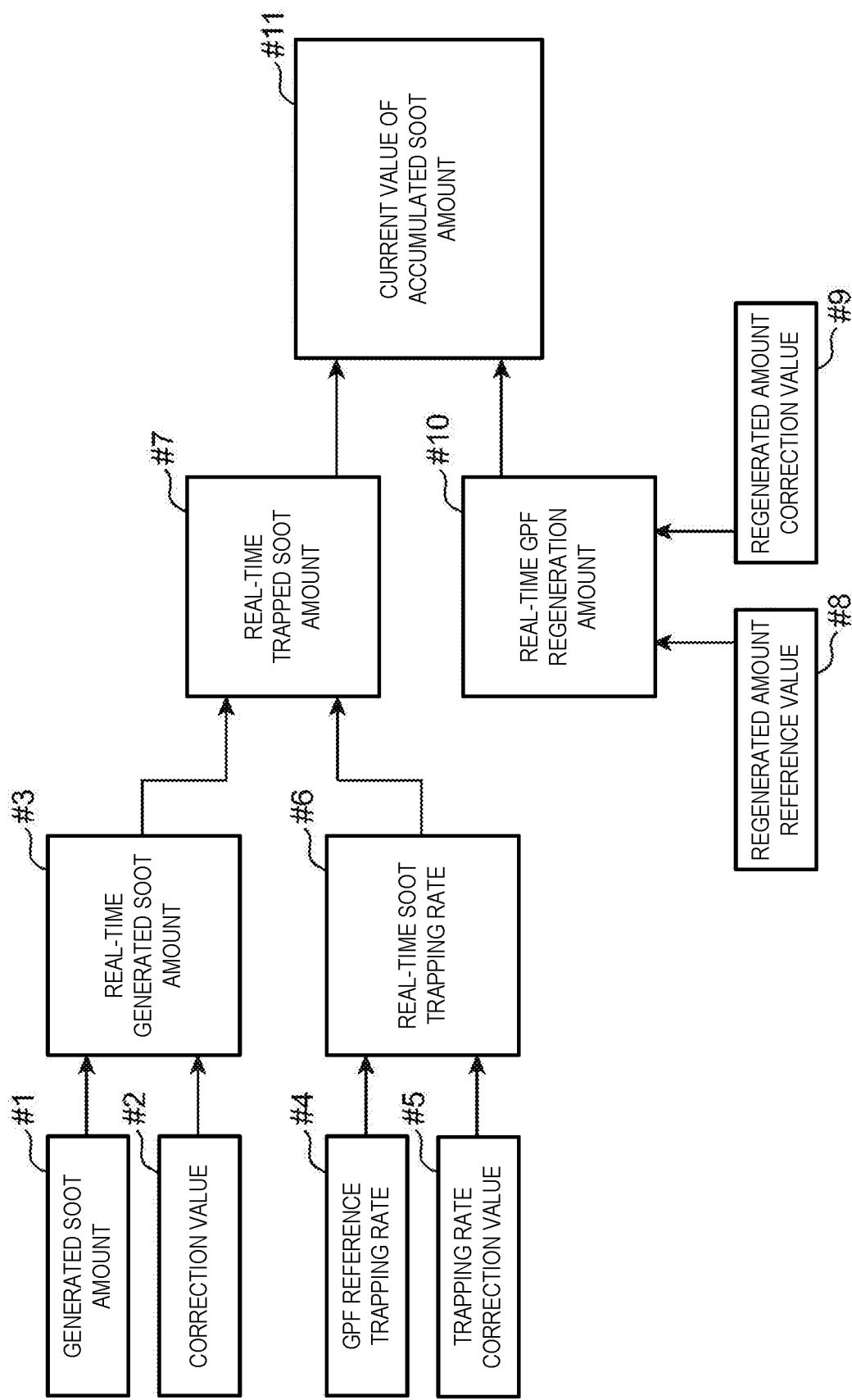
FIG. 3 is a block chart showing a specific procedure for estimating the amount of soot that has accumulated in a GPF.

FIG. 3 is a block chart showing a specific procedure for estimating the amount of soot that has accumulated in the GPF 41b. A generated soot amount (block #1) in the current operating state and a correction value (block #2) for correction thereof are used to obtain a real-time generated soot amount (block #3). The generated soot amount of block #1 is derived based on a map in which current operation modes (air-fuel ratios, ignition timings, etc.), EGR amounts, engine rotation speeds, engine loads, and the like are associated with generated soot amounts, for example. The correction value of block #2 is a value for correcting the generated soot amount of block #1, and is determined by the engine water temperature or the like. If the generated soot amount can be specified merely using the map, the correction value of block #2 is omitted. The real-time generated soot amount of block #3 is obtained by multiplying the generated soot amount of block #1 by the correction value of block #2. This real-time generated soot amount is the amount of soot that flows into the GPF 41b in the current state.

In parallel with blocks #1 to #3, a reference trapping rate (block #4) indicating a reference value of the soot trapping rate of the GPF 41b and a correction value (block #5) for the reference trapping rate are used to obtain a real-time soot trapping rate (block #6) of the GPF 41b. The reference trapping rate of block #4 is determined using the amount of exhaust gas that passes through the GPF 41b and the current amount of accumulated soot in the GPF 41b. A map associating passing exhaust gas amounts and accumulated soot amounts is used to derive the reference trapping rate. The trapping rate correction value in block #5 is a correction value that corresponds to the amount of incombustible combustion product (ash) deriving from an engine oil component that has accumulated in the GPF 41b. As ash accumulates in the GPF 41b, the soot trapping rate decreases. The amount of accumulated ash can be estimated from the engine rotation speed and the load integrated value, and the trapping rate correction value is derived from the estimated value. The real-time soot trapping rate of block #6 is obtained by multiplying the reference trapping rate of block #4 by the correction value of block #5.

The real-time generated soot amount (block #3) and the real-time soot trapping rate (block #6) that are obtained as described above are used to obtain a real-time trapped soot amount (block #7). The real-time trapped soot amount is the soot trapping performance of the GPF 41b in the current state.

In parallel with the calculation of the soot trapping performance of the GPF 41b in blocks #1 to #7, the soot regeneration performance of the GPF 41b in the current state is obtained. Specifically, a regenerated amount reference value (block #8) indicating the amount of regenerated soot in the GPF 41b in the current state and a correction value (block #9) for correcting the regenerated amount reference value are used to obtain a real-time regenerated soot amount of the GPF 41b (block #10).

The regenerated amount reference value of block #8 is obtained using a map that associates GPF 41b temperatures (detection values from the exhaust temperature sensor SN9) with exhaust gas oxygen concentrations. The higher the temperature of the GPF 41b is, and the higher the oxygen concentration is, the easier it is for accumulated soot to burn, and therefore the higher the regenerated amount reference value is. The oxygen concentration can be derived by referencing the air intake amount, the EGR amount, the ignition timing, the fuel injection amount, and the like. If an $O_2$ sensor is arranged in the exhaust passage 40, the oxygen concentration can be derived based on a detection value from the 02 sensor. The regenerated amount correction value of block #9 is derived by referencing the current accumulated soot amount in the GPF 41b. The real-time regenerated soot amount of block #10 is obtained by multiplying the regenerated amount reference value of block #8 by the correction value of block #9.

The current value of the accumulated soot amount (block #11) is obtained by subtracting the real-time regenerated soot amount of block #10 from the real-time trapped soot amount of block #7. In other words, while the GPF 41b traps soot, regeneration is also performed if soot burning conditions are met, and therefore the trapping and the regeneration cancel each other out when obtaining the accumulated soot amount in a sampling period. The current value of the accumulated soot amount in block #11 is derived by adding the accumulated soot amount of the current period to an integrated value of past amounts. The above is a specific example of processing performed by the accumulation estimation module 103 to estimate the amount of accumulated soot in the GPF 41b.

(2) Regeneration Processing

The regeneration control module 104 performs regeneration control for burning soot that has accumulated in the GPF 41b, that is to say control for correcting the air-fuel ratio of the air-fuel mixture supplied to the combustion chamber 6 to a ratio that is leaner than a stoichiometric air-fuel ratio, and/or control for correcting the air-fuel mixture ignition timing to a retarded timing relative to the timing in normal operation. Setting the air-fuel mixture to a lean ratio produces an excess of oxygen in combustion in the combustion chamber 6, thus making it possible for oxygen to be supplied to the GPF 41b in the exhaust passage 40. Retarding the ignition timing causes uncombusted oil components to be produced along with the oxygen, and these components can be supplied to the GPF 41b. The soot that has accumulated in the GPF 41b can be burned using the supplied oxygen and/or the supplied uncombusted oil components.

Figure 4:
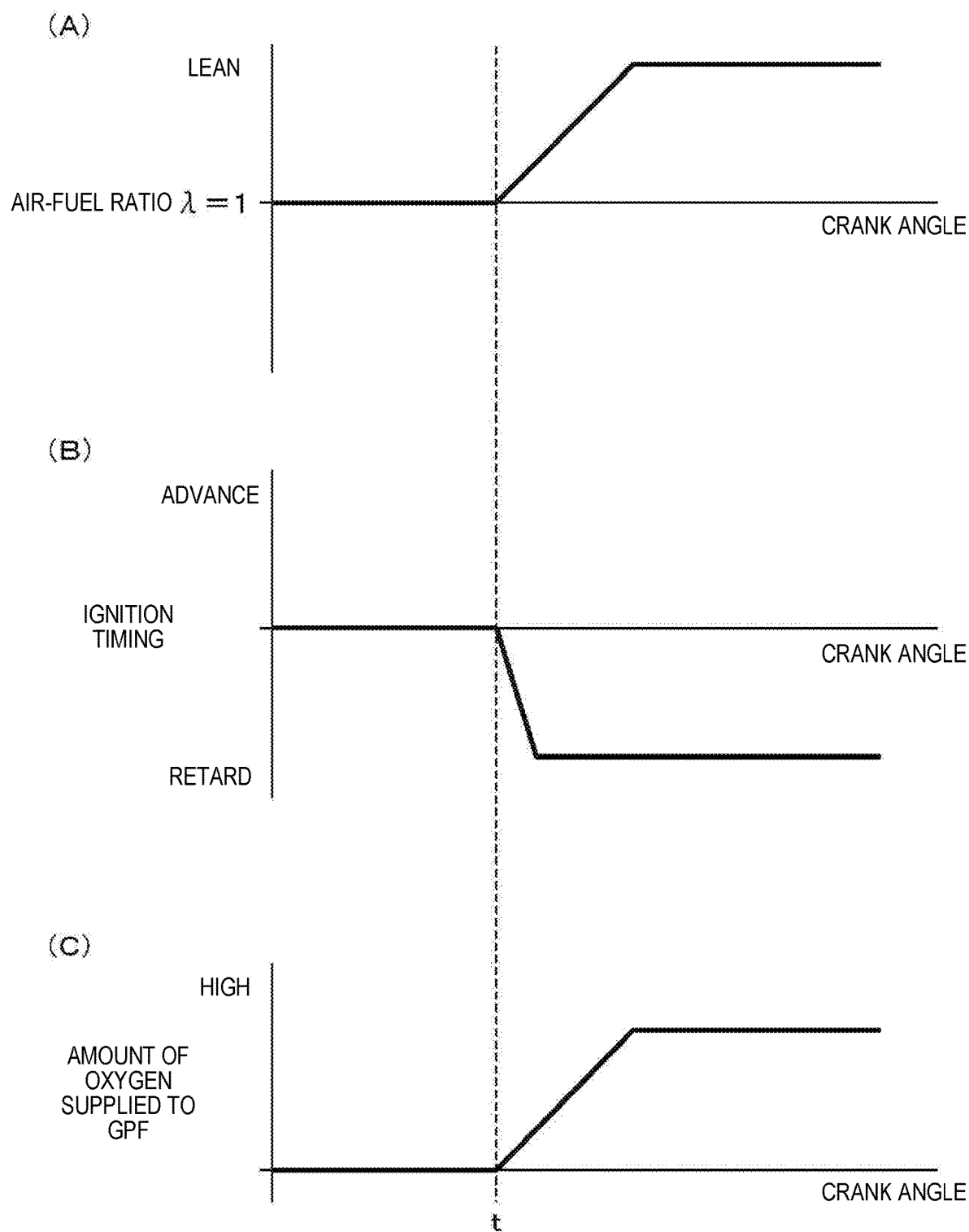
FIG. 4 is a timing chart showing an example of GPF regeneration control.

In FIG. 4, (A) to (C) are timing charts showing an example of GPF 41b regeneration control. In the example shown here, lean correction for setting the air-fuel ratio to a lean ratio and retarding correction for retarding the ignition timing are both performed. Note that it is not necessarily required for both lean correction and retarding correction to be performed, and it is sufficient that at least either one is performed. A time t shown in FIG. 4 is the start timing of regeneration control.

Assuming that the engine has been running with the air-fuel ratio set at the stoichiometric air-fuel ratio ($\lambda$=1) up to the time t for example, the regeneration control module 104 corrects the air-fuel ratio to a lean ratio by increasing the amount of air relative to the amount of fuel (lean correction) as shown in (A) of FIG. 4. The regeneration control module 104 also retards the air-fuel mixture ignition timing of the spark plug 16 relative to the ignition timing that has been obtained in the current operating state (retarding control) as shown in (B) of FIG. 4.

In FIG. 4, (C) shows the amount of oxygen that is supplied to the GPF 41b. The oxygen supply amount is increased at the time t. This is due to the fact that if the amount of oxygen discharged from the combustion chamber 6 is increased due to the aforementioned lean control, an "after-burn" state occurs due to retarding control, and the amount of excess oxygen increases. Note that due to retarding control, uncombusted oil components are also supplied to the GPF 41b along with oxygen. Accordingly, if the temperature of the GPF 41b has reached a temperature for inducing the burning of accumulated soot, GPF 41b regeneration processing is performed spontaneously.

(3) Fuel Restriction Control Prohibition Processing

Figure 5:
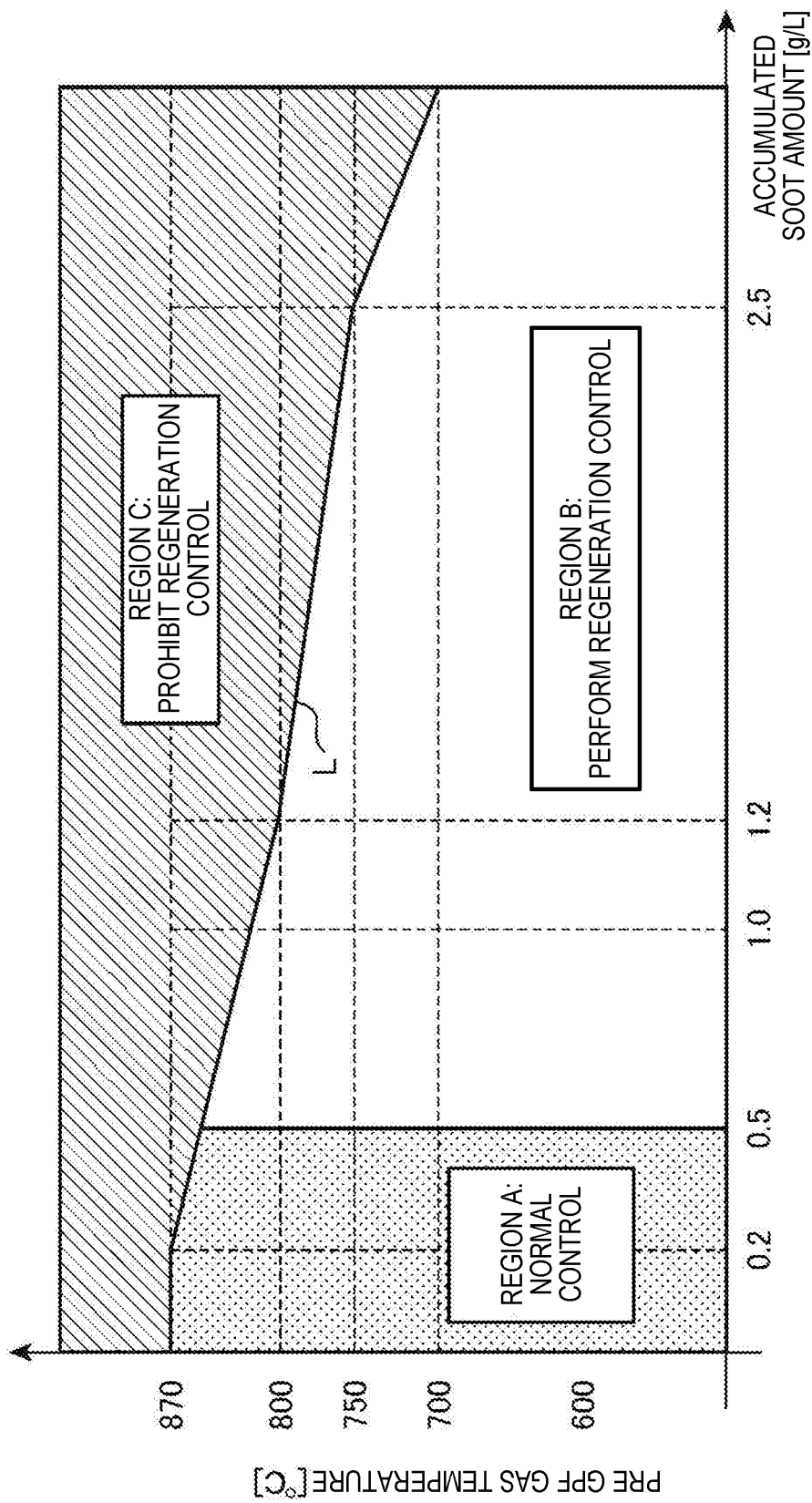
FIG. 5 is a graph showing a relationship between a fuel cut prohibition temperature and an accumulated soot amount.

FIG. 5 is a graph showing an example of a relationship between a fuel cut prohibition temperature and an accumulated soot amount in a case where the above-described fuel restriction control is fuel cutting performed during deceleration. In FIG. 5, L denotes a fuel cut prohibition line. The storage device 108 stores a table in which GPF 41b accumulated soot amounts and GPF 41b temperatures (temperatures of exhaust gas introduced to the GPF 41b, which are hereinafter called "GPF temperatures") are associated with each other as shown in FIG. 5.

As shown in FIG. 5, three regions A to C are defined in the relationship between the accumulated soot amount and the GPF temperature. The region A is a region in which the accumulated soot amount is a low amount less than 0.5 [g/L], and is a region in which normal control is performed, in the sense that GPF 41b regeneration control is not performed. If the accumulated soot amount is in the range of the region A, the soot trapping performance of the GPF 41b has not decreased very much, and there is no need to perform regeneration processing.

The region B is a region in which the accumulated soot amount is greater than or equal to 0.5 [g/L]. If the accumulated soot amount reaches the range of the region B, a decrease in the soot trapping performance of the GPF 41b has manifested, and therefore regeneration control is performed by the regeneration control module 104. Regeneration control is performed until the accumulated soot amount has decreased to an amount in the range of the region A.

Separately from the above-described regeneration control, fuel cutting control is performed by the fuel injection control module 102 during deceleration. In other words, an operating situation that requires the fuel cutting control may occur regardless of the accumulated soot amount and the GPF temperature. The fuel cut prohibition line L is a line according to which a GPF temperature at which the performance of fuel cutting control is prohibited (prohibition temperature) is defined for each accumulated soot amount. The fuel cut prohibition line L is inclined such that the prohibition temperature falls as the accumulated soot amount rises. In the example shown here, the prohibition temperature is 870° C. if the accumulated soot amount is less than 0.2 [g/L] (region A), and the prohibition temperature is 750° C. if the accumulated soot amount is 2.5 [g/L] (a point in the region B). Note that the GPF temperature of 870° C. is the upper limit value of the GPF temperature in normal operation.

If fuel cutting, which results in the supply of oxygen to the GPF 41b, is performed when the GPF temperature is a high temperature, the soot that has accumulated in the GPF 41b burns all at once, which can lead to thermal degradation of the GPF 41b. Also, the amount of thermal energy tends to rise when the accumulated soot amount is high, and therefore it is desirable to set a lower prohibition temperature as the accumulated soot amount rises, in order to prevent thermal degradation. The fuel cut prohibition line L is a prohibition temperature line that is set based on this reasoning. The region C shown in FIG. 5 is a region in which the GPF temperature exceeds the fuel cut prohibition line L. When the GPF temperature at the current accumulated soot amount has exceeded the fuel cut prohibition line L (region C), the prohibition control module 106 prohibits fuel cutting. This therefore makes it possible to protect the GPF 41b.

Control Flow

Figure 6:
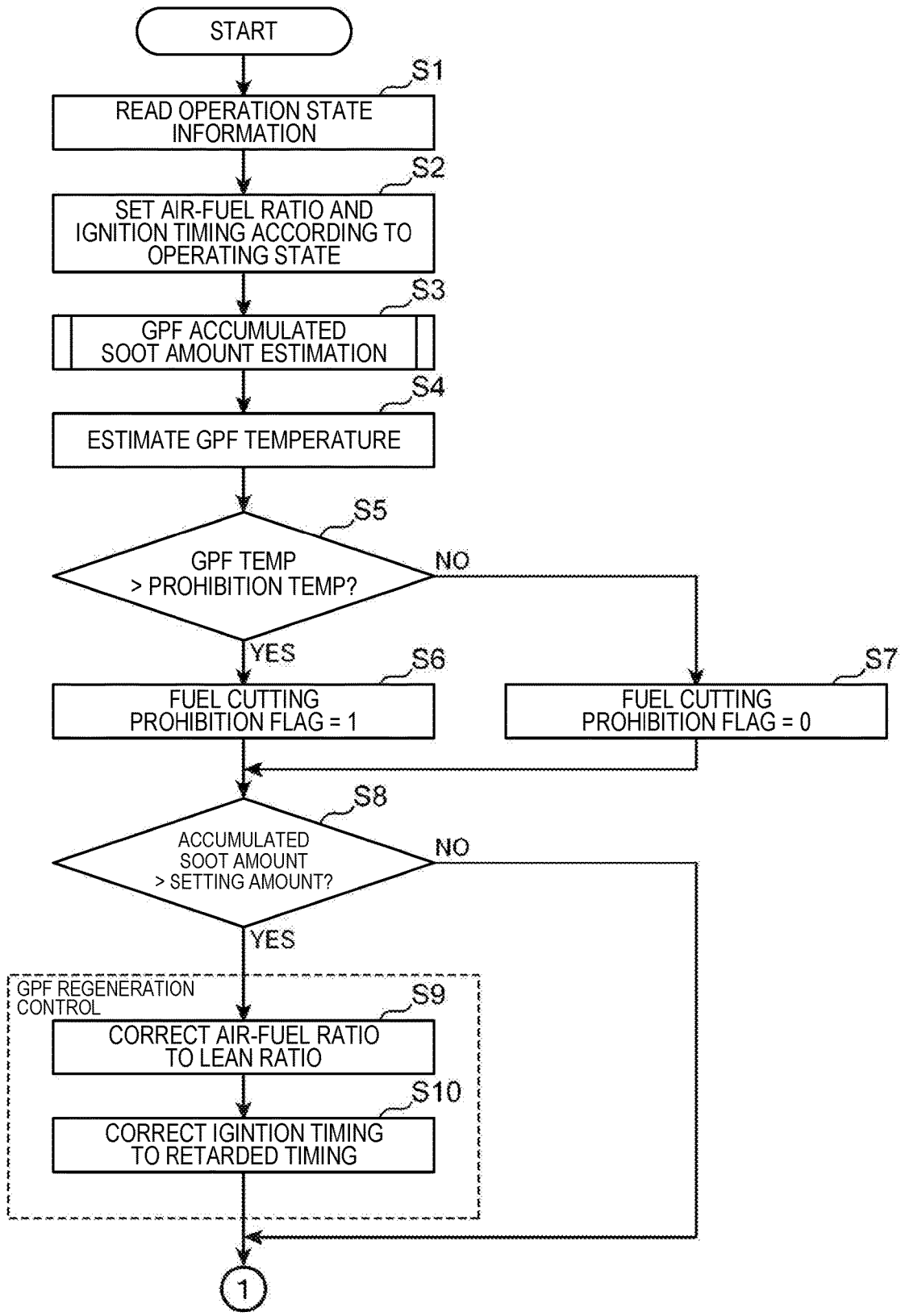
FIG. 6 is a timing chart showing an example of engine operation control.
Figure 7:
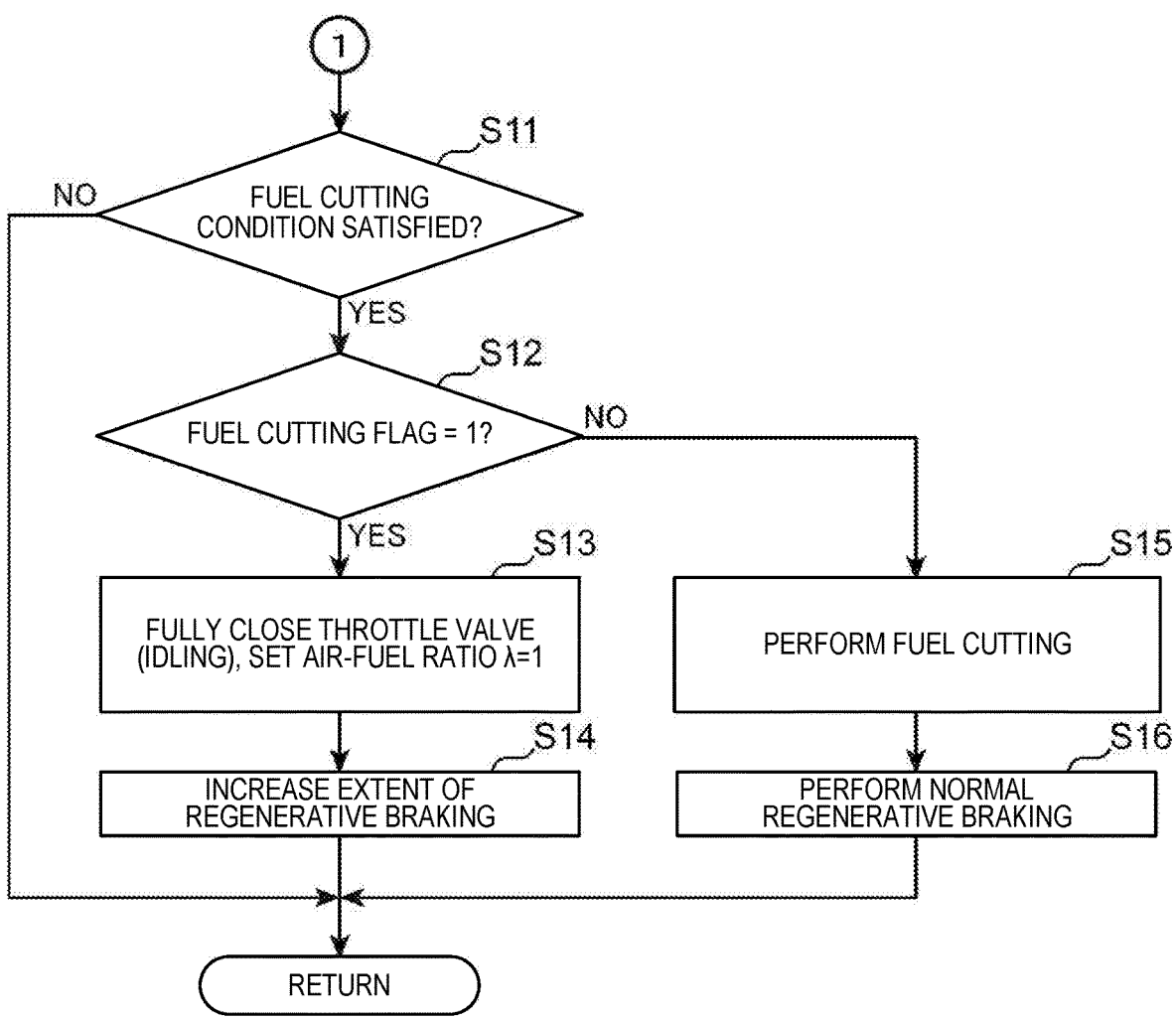
FIG. 7 is a timing chart showing an example of engine operation control.

FIGS. 6 and 7 are timing charts showing an example of engine operation control performed by the ECU 100. In the example of operation control described below, it is envisioned that the fuel restriction control is fuel cutting control performed during vehicle deceleration.

The ECU 100 acquires information regarding the operation region of the vehicle (the operating state of the engine body 1) from the sensors SN1 to SN11 shown in FIG. 2 and other sensors (step S1). The acquired information includes the engine rotation speed, the load, the air intake amount, the intake air temperature, the intake pressure, the exhaust temperature, and the like. An air-fuel ratio and an air-fuel mixture ignition timing are set in accordance with the current operating state based on such information (step S2). Specifically, an air intake amount and a fuel injection amount are determined by the intake control module 101 and the fuel injection control module 102 such that a target air-fuel ratio and a target torque are achieved, and the ignition timing of the spark plug 16 is set such that a target heat production amount is obtained. The set air-fuel ratio and ignition timing serve as a correction base in the GPF 41b regeneration control described later.

Next, the accumulation estimation module 103 performs processing for estimating the accumulated soot amount in the GPF 41b (step S3). This accumulated soot amount estimation processing has already been described with reference to FIG. 3. Next, an estimated value of the GPF temperature is acquired by the GPF temperature estimation module 105 (step S4). As previously described, in the present embodiment, the exhaust gas temperature detected by the exhaust temperature sensor SN9 is handled as the GPF temperature.

The prohibition control module 106 then references the accumulated soot amount that was obtained in step S3, the GPF temperature that was obtained in step S4, and the fuel cut prohibition line L (FIG. 5) stored in the storage device 108, and determines whether or not the GPF temperature has exceeded the prohibition temperature (GPF temperature>prohibition temperature) at the current accumulated soot amount (step S5). If the GPF temperature has exceeded the prohibition temperature (YES in step S5), the prohibition control module 106 sets a fuel cut prohibition flag to 1 (step S6). When set to 1, the prohibition flag indicates that the performance of fuel cutting control is to be prohibited. On the other hand, if the GPF temperature is less than or equal to the prohibition temperature (NO in step S5), the prohibition control module 106 sets the fuel cut prohibition flag to 0 (step S7). When set to 0, the prohibition flag indicates that the performance of fuel cutting control is to be permitted.

Thereafter, the regeneration control module 104 determines whether or not the accumulated soot amount in the GPF 41b that was estimated by the accumulation estimation module 103 (step S3) has exceeded a predetermined setting amount (step S8). In the example shown in FIG. 5, the setting amount is 0.5 [g/L]. If the accumulated soot amount has exceeded the setting amount (YES in step S8), the regeneration control module 104 performs GPF 41b regeneration control. If the accumulated soot amount is less than or equal to the setting amount (NO in step S8), regeneration control is skipped. The content of regeneration control includes control for correcting the air-fuel ratio that was set in step S2 to a lean ratio (step S9; see (A) in FIG. 4) and control for correcting the ignition timing that was set in step S2 to a retarded timing (step S10; see (B) in FIG. 4).

In this situation, the fuel injection control module 102 determines whether or not a condition for performing fuel cutting has been satisfied (step S11). For example, the fuel injection control module 102 detects a decelerating state of the vehicle based on the fact that the throttle valve 32 is fully closed, and determines that a fuel cutting condition has been satisfied. If the decelerating state is not detected, the fuel injection control module 102 determines that the fuel cutting condition has not be satisfied (NO in step S11), and processing in the current sampling period ends without the performance of fuel cutting.

In contrast, if the decelerating state was detected, and it was determined that the fuel cutting condition has been satisfied (YES in step S11), it is then determined whether or not the fuel cut prohibition flag has been set to 1 (step S12). If the prohibition flag has been set to 1 (YES in step S12), the prohibition control module 106 prohibits the performance of fuel cutting control by the fuel injection control module 102. In this case, the throttle valve 32 is set to the fully closed state (idling state opening degree), and the intake control module 101 sets the air-fuel mixture air-fuel ratio to the stoichiometric air-fuel ratio ($\lambda=1$) (step S13). Although the supply of fuel from the injector 15 continues due to the performance of fuel cutting control being prohibited, the engine rotation speed is higher than when in an idling state, and therefore deceleration can be achieved. Also, by setting $\lambda$ to 1 when prohibiting fuel cutting control, it is possible to suppress the worsening of emissions.

Although deceleration is achieved as described above, fuel is supplied to the combustion chamber 6 during deceleration as well, and therefore the extent of deceleration decreases. In order to compensate for this decrease in deceleration, the recovery control module 107 increases the extent of regenerative braking performed by the ISG 60, thus increasing the regenerating braking force (step S14). This therefore makes it possible to prevent the driver of the vehicle from feeling a concerning sensation of insufficient deceleration.

In contrast, if the prohibition flag has been set to 0 (NO in step S12), the fuel injection control module 102 performs a fuel cutting control (step S15). Also, the recovery control module 107 causes the ISG 60 to generate regenerative braking force under normal conditions (step S16). After the performance of step S14 or step S16 described above, processing in the current sampling period is ended (return to step S1).

Effects

According to the engine control device (ECU 100) of the present embodiment described above, the regeneration control module 104 performs regeneration control if the amount of accumulated soot in the GPF 41b exceeds a setting amount. Also, the fuel injection control module 102 performs a fuel restriction control, one typical example being fuel cutting for stopping the injection of fuel from the injector 15 during deceleration for example. The fuel restriction control prohibition temperature is set in advance (the fuel cut prohibition line L in FIG. 5). When the temperature of the GPF 41b is higher than the prohibition temperature, the prohibition control module 106 prohibits the performance of fuel restriction control by the fuel injection control module 102. In other words, regardless of the accumulated amount of soot in the GPF 41b, when the temperature of the GPF 41b is higher than the prohibition temperature, fuel restriction control, which results in the supply of oxygen to the GPF 41b, is not performed. For this reason, when the prohibition temperature has been exceeded, soot is not burned in the GPF 41b due to the performance of fuel restriction control. Accordingly, it is possible to prevent thermal degradation of the GPF 41*b*.

The present invention is not limited to the embodiment described above, and various modified embodiments can be implemented. For example, in addition to the deceleration fuel cutting condition, other fuel restriction control (over-revolution control) may also be taken in consideration in step S11 in FIG. 7. Also, an example in which the ISG 60 is provided in the vehicle is described in the above embodiment. Alternatively, a configuration is possible in which the ISG 60 is omitted, and the control in steps S14 and S16 in FIG. 7 is omitted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, a phrase of the form "at least one of A and B" means at least one A or at least one B, without being mutually exclusive of each other, and does not require at least one A and at least one B. If used herein, the phrase "and/or" means either or both of two stated possibilities.

REFERENCE CHARACTERS

1 Engine body
15 Injector (fuel injection device)
16 Spark plug
40 Exhaust passage
41 Upstream catalytic converter
41*b* GPF (particulate filter)
60 ISG (electrical device)
100 ECU (engine control device)
101 Intake control module
102 Fuel injection control module (supply control module)
103 Accumulation estimation module (estimation module)
104 Regeneration control module
105 GPF temperature estimation module
106 Prohibition control module
107 Recovery control module
108 Storage device
L Fuel cut prohibition line (prohibition temperature)

What is claimed is:

1. An engine control device, comprising:
a particulate filter that is arranged in an exhaust passage of an engine;
a fuel injection device that supplies fuel to the engine;
a storage device that stores a prohibition temperature according to which a fuel restriction control is to be prohibited; and
a processor configured to execute:
a supply control module that performs the fuel restriction control for restricting supply of the fuel by the fuel injection device if a predetermined fuel restriction condition is satisfied;
an estimation module that estimates an accumulated amount of soot trapped in the particulate filter;
a regeneration control module that performs a regeneration control for regenerating the particulate filter by burning soot when the accumulated amount estimated by the estimation module exceeds a predetermined setting amount; and
a prohibition control module that prohibits performance of the fuel restriction control by the supply control module when the prohibition control module determines that a temperature of the particulate filter obtained by a particulate filter temperature estimation module is higher than the prohibition temperature and permits performance of the fuel restriction control by the supply control module when the prohibition control module determines that the temperature of the particulate filter obtained by the particulate filter temperature estimation module has exceeded the prohibition temperature is less than or equal to the prohibition temperature, the prohibition temperature for the fuel restriction control of the prohibition control module being set higher when the accumulated amount of soot is lower than when the accumulated amount of soot is higher.

2. The engine control device according to claim 1, wherein the supply control module performs the fuel restriction control if deceleration of the engine is detected.

3. The engine control device according to claim 2, wherein the supply control module performs fuel cutting if deceleration of the engine is detected.

4. The engine control device according to claim 3, wherein deceleration of the engine is detected when a fully closed state of a throttle valve is detected.

5. The engine control device according to claim 3, wherein the processor is further configured to execute an intake control module that performs a control such that an air-fuel ratio of an air-fuel mixture to be supplied to the engine is set to a stoichiometric air-fuel ratio if the prohibition control module prohibits performance of the fuel restriction control.

6. The engine control device according to claim 1, wherein when performing the regeneration control, the regeneration control module performs at least one of control for correcting an air-fuel ratio of an air-fuel mixture to be supplied to the engine to a ratio that is leaner than a stoichiometric air-fuel ratio and control for correcting an air-fuel mixture ignition timing to a retarded timing relative to an ignition timing during normal operation.

7. The engine control device according to claim 2, wherein the engine includes an electrical device that performs regenerative braking, and
the processor is further configured to execute a recovery control module that increases an extent of the regenerative braking if the prohibition control module prevents performance of the fuel restriction control.

8. An engine control method performed by an engine control device including a particulate filter that is arranged in an exhaust passage of an engine, a fuel injection device that supplies fuel to the engine, and a processor, the engine control method comprising the steps of:
executing a fuel restriction control for restricting supply of the fuel by the fuel injection device if a predetermined fuel restriction condition is satisfied;
estimating an accumulated amount of soot trapped in the particulate filter;
executing a regeneration control for regenerating the particulate filter by burning soot when the estimated accumulated amount exceeds a predetermined setting amount; and
prohibiting execution of the fuel restriction control when a prohibition control module determines that a temperature of the particulate filter obtained by a particulate filter temperature estimation module is higher than a prohibition temperature, according to which the fuel restriction control is prohibited, and permits the execution of the fuel restriction control when the prohibition control module determines that the temperature of the particulate filter obtained by the particulate filter temperature estimation module has exceeded the prohibition temperature is less than or equal to the prohibition temperature, the prohibition temperature for the fuel restriction control of the prohibition control module being set higher when the accumulated amount of soot is low than when the accumulated amount of soot is high.

9. The engine control device according to claim 1,
wherein when the accumulated amount of soot has exceeded the setting amount, the regeneration control module performs the regeneration control,
wherein when the accumulated amount of soot is less than or equal to the setting amount, the regeneration control module skips the regeneration control, and
wherein when performing the regeneration control, the regeneration control module performs at least one of control for correcting an air-fuel ratio of an air-fuel mixture to be supplied to the engine to a ratio that is leaner than a stoichiometric air-fuel ratio and control for correcting an air-fuel mixture ignition timing to a retarded timing relative to an ignition timing during normal operation.

10. The engine control device according to claim 1,
wherein when the prohibition control module determines that the temperature of the particulate filter obtained by the particulate filter temperature estimation module is higher than the prohibition temperature, the regeneration control module skips the regeneration control regardless of the accumulated amount of soot in the particulate filter.

* * * * *